United States Patent [19]

Friedrich

[11] Patent Number: 4,770,651
[45] Date of Patent: Sep. 13, 1988

[54] HYDRAULICALLY CONTROLLED SHAFT COUPLING

[75] Inventor: Karl Friedrich, Leibnitz, Austria

[73] Assignee: Steyr-Daimler-Puch Aktiengesellschaft, Vienna, Austria

[21] Appl. No.: 12,738

[22] Filed: Feb. 9, 1987

[30] Foreign Application Priority Data

Feb. 14, 1986 [AT] Austria .................................. 376/86

[51] Int. Cl.$^4$ .............................................. F16D 3/80
[52] U.S. Cl. ........................................ 464/27; 464/24; 464/38
[58] Field of Search ...................... 192/59, 60; 464/24, 464/27, 28, 37, 38, 160

[56] References Cited

U.S. PATENT DOCUMENTS

| | | | |
|---|---|---|---|
| 2,408,501 | 10/1946 | Wright | 464/27 X |
| 2,595,479 | 5/1952 | Nelson | 192/60 |
| 2,872,794 | 2/1959 | Slomer | 464/27 |
| 2,888,118 | 5/1959 | Dymeck et al. | 192/59 |
| 3,425,239 | 2/1969 | Baier | 464/27 |
| 3,488,980 | 1/1970 | Burrough | 464/27 X |
| 3,608,334 | 9/1971 | Zinner | 464/38 X |

FOREIGN PATENT DOCUMENTS

| | | | |
|---|---|---|---|
| 0582039 | 6/1983 | European Pat. Off. | |
| 2729775 | 1/1979 | Fed. Rep. of Germany | |
| 2303205 | 10/1976 | France | 464/27 |
| 933614 | 8/1963 | United Kingdom | 464/37 |
| 1548315 | 7/1979 | United Kingdom | 464/24 |

Primary Examiner—Daniel P. Stodola
Attorney, Agent, or Firm—Marmorek, Guttman & Rubenstein

[57] ABSTRACT

A shaft coupling comprises two coupling members, which are connected or adapted to be connected to respective shafts. One of the two coupling members is provided on a coupling face with an even number of bores, which have a uniform angular spacing and are either parallel to the axis of rotation of the coupling or radial with respect to said axis. A piston is slidably mounted in each bore and has a coupling end face with is beveled or crowned. Hydraulic lines are provided for applying fluid pressure to each piston at its rear end. The other coupling member is provided on a coupling face with an annular series of alternating elevations and depressions, which also have a uniform angular spacing. By the application of hydraulic pressure to the rear end faces of the pistons, the coupling end faces of the pistons are urged against the elevations and depressions. To permit a control of the torque transmission capacity of the coupling so that said capacity can be decreased to zero and to ensure that the torque transmission capacity will be independent of the slip between surfaces in frictional contact and of any change of the viscosity of a liquid, the bores are arranged in pairs of diametrically opposite bores and the bores of each pair communicate with each other through a hydraulic line, which is permanently filled with a hydraulic liquid. A controllable throttle valve is associated with each of said hydraulic lines. Adjacent ones of said elevations and depressions merge into each other.

9 Claims, 2 Drawing Sheets

HYDRAULICALLY CONTROLLED SHAFT COUPLING

BACKGROUND OF THE INVENTION

1. Field of the Invention

This invention relates to a shaft coupling comprising two coupling members adapted to be associated with respective shafts, one of said coupling members being formed with an even number of bores having a uniform angular spacing, a plurality of pistons, each of which is slidably mounted in one of said bores and has beveled or convex inner end faces, and means for applying fluid pressure to the other end face of each of said pistons, wherein the other coupling member is formed on its surface facing the first-mentioned coupling member with an annular series of elevations and depressions which are engageable by said inner end faces of said pistons.

2. Description of the Prior Art

Various types of shaft couplings are known. Such couplings comprise so-called multiple disc clutches in which the friction between the discs can be increased in that the discs are forced against each other by means of a fluid-operated piston. The torque transmission capacity of such clutches will depend on the slip between adjacent discs and said slip will depend on the contact pressure. If such clutches are frequently engaged and disengaged or a slip between discs occurs for a relatively long time, the discs will be strongly heated and the clutch must be cooled. Such cooling requires an additional expenditure and increases also the wear of the discs. Hydrostatic transmissions are known, which comprise a pump and a motor and in said pump and in said motor comprise pistons, which are interconnected by a hydraulic linkage and cooperate with respective swash plates. The torque transmission capacity of such transmissions can be controlled by an adjustment of the inclination of the swash plate. Such transmissions have a highly complicated, bulky structure. Besides, liquid friction couplings are known, which comprise a housing, which is filled with a viscous liquid and constitutes one coupling member, whereas the second coupling member comprises a shaft, which extends into and out of the housing. First and second sets of discs are non-rotatably connected to the housing and the shaft, respectively, and the discs of said sets interdigitate. Different from the conventional multiple disc couplings the transmission of torque in liquid friction couplings is not due to the frictional contact between the discs but is due to shearing forces taken up by the viscous liquid and the torque transmission capacity will depend on the speed difference between the two coupling members. An arbitrary control of the torque transmission capacity is difficult. In particular, the torque transmission capacity cannot be decreased to zero by a control. Another disadvantage is the high dependence on the temperature-dependent viscosity of the liquid.

SUMMARY OF THE INVENTION

It is an object of the invention to eliminate said disadvantages and to provide a shaft coupling which can be controlled to decrease the torque transmission capacity to zero independently of the slip between surfaces in frictional contact with each other and which will be virtually unaffected by a change of a viscosity of a liquid and is relatively simple in design.

That object is accomplished in accordance with the invention in that the diametrically opposite bores of each pair thereof are interconnected by a hydraulic line which is always completely filled with liquid, an adjustable throttle valve is associated with each of said hydraulic lines, and the elevations and depressions of the other coupling member merge into each other.

When one coupling member or the other is driven, the pistons which are either parallel to the axis of rotation of the coupling member or radial with respect thereto are reciprocated as they cooperate with the depressions and elevations because the two diametrically opposite pistons of each pair are actuated by the same column of liquid in the permanently liquid-filled hydraulic line. When the throttle valve associated with the connecting hydraulic line is entirely open, there will be no transmission of torque. When the hydraulic line is more or less constricted by the throttle valve, that piston which moves inwardly in the bore of the one coupling member will effect in said line a pressure rise, which owing to the cooperation of the piston with the elevations and depressions of the other coupling member will cause the desired circumferential force to be transmitted between the coupling members. As a result, the torque transmission capacity will depend on the free cross-sectional area of the hydraulic line at the throttle valve and when the connecting line is entirely closed the torque can be completely transmitted without a speed loss in theory. It will be understood that in such an arrangement any viscosity changes of the hydraulic fluid will not exert a substantial influence and that such influences can be perfectly compensated by a proper control of the throttle valves. The novel shaft coupling does not contain any parts which could be subjected to substantial wear.

All throttle valves can be actuated at the same time in the same sense to ensure a uniform distribution of the transmitted torque to all pistons.

In a preferred arrangement the throttle valves comprise pins, which are slidably mounted in valve bores, which intersect the hydraulic lines and extend parallel to the axis of rotation of the coupling, and said pins are secured to an adjusting ring, which is slidably mounted on a shaft which is non-rotatably connected to the coupling member formed with the valve bores. In that arrangement the throttle valves can be simultaneously actuated in the same sense in that the pins are displaced by means of the adjusting ring.

Within the scope of the invention the elevations as well as the depressions may be odd in number so that a uniform transmission of torque will be ensured.

DETAILED DESCRIPTION OF THE PREFERRED EMBODIMENT

Figure 1:
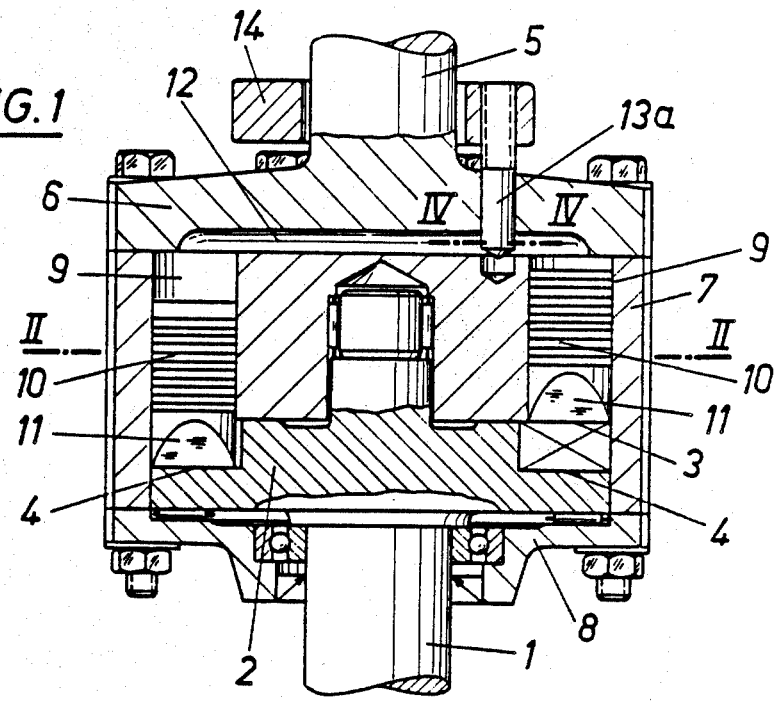
FIG. 1 is a sectional view taken on line I—I of FIG. 2, which line extends through the axis of shafts connected by a shaft coupling.
Figure 2:
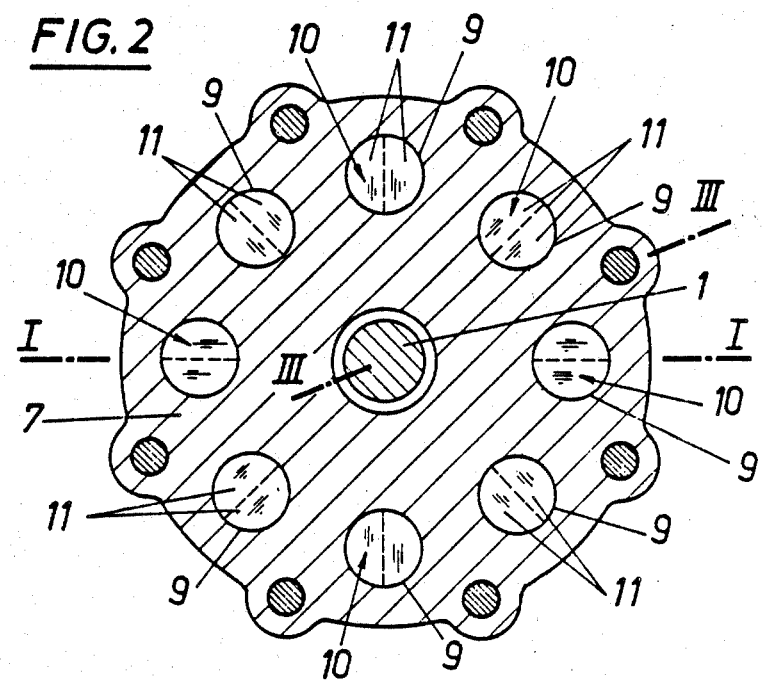
FIG. 2 is a transverse sectional view taken on line II—II in FIG. 1.
Figure 3:
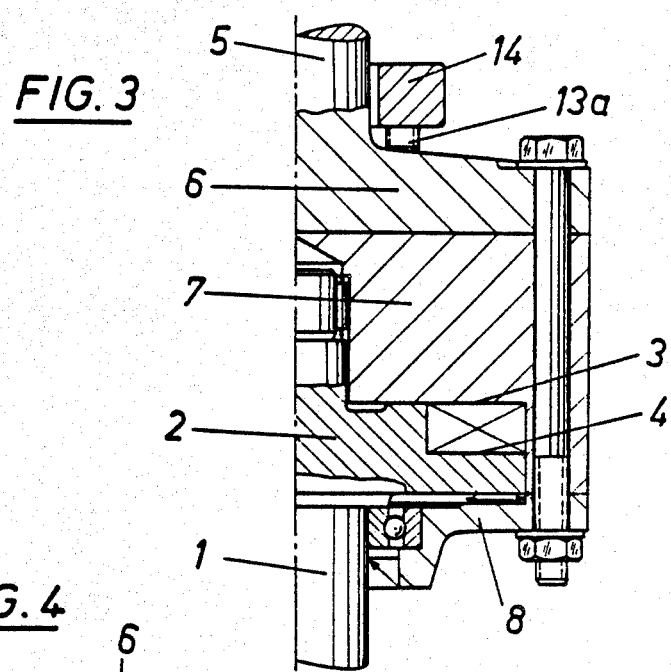
FIG. 3 is an axial sectional view taken on line III—III in FIG. 2 and shows one half of the coupling.
Figure 4:
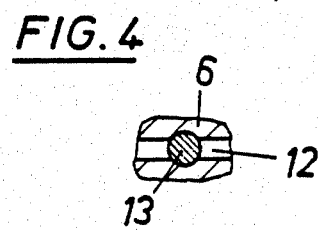
FIG. 4 is a sectional view taken on line IV—IV in FIG. 1 and shows a detail.
Figure 5:
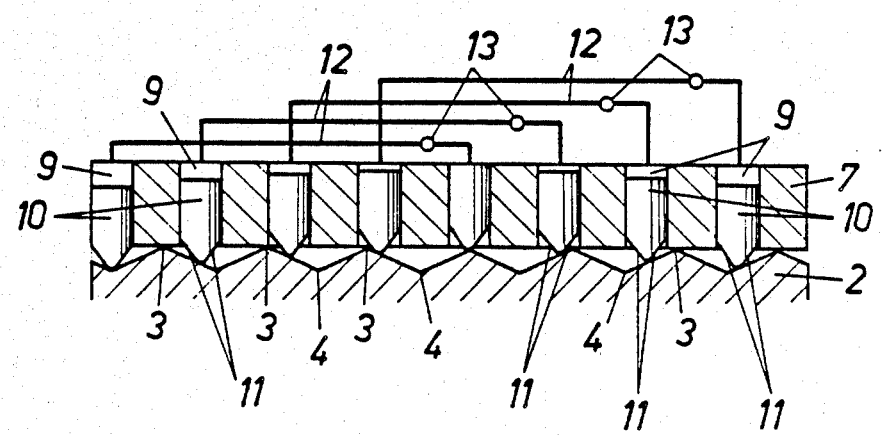
FIG. 5 is a diagrammatic developed view showing the pistons cooperating with the elevations and depressions.

A driving shaft 1 is firmly connected to or integral with a disc-shaped coupling member 2. The coupling member 2 is formed on its coupling end face with a circumferential annular series of alternating elevations 3 and depressions 4, which have a uniform angular spacing and merge into each other, as shown in FIG. 5. A driven shaft 5 is integral with a flange 6, which is firmly screw-connected to a core 7 and a cover 8. The parts 6, 7, 8 constitute a housing, which is filled with liquid and in which the coupling member 2 is rotatably mounted. That housing 6, 7, 8 constitutes the other coupling member. The core 7 is formed with a circumferential annular series of bores 9, which are even in number and have parallel axes and each of which contains a piston 10, which is slidable in the bore. The annular series of alternating elevations 3 and depressions 4 and the annular series of bores 9 are circular series centered on a common axis, which is the axis of rotation of the coupling. Each piston 10 has a coupling end face, which faces the other coupling member and is formed with two beveled surfaces 11 so that said coupling end face is roof-shaped. The pistons 10 are arranged in pairs of diametrically opposite pistons and the pistons of each of said pairs are interconnected by a hydraulic line 12. The hydraulic lines 12 and the bores 9 are permanently filled with a hydraulic fluid. Each hydraulic line 12 is provided with a controllable throttle valve 13, which comprises a pin 13a. The pins 13a have parallel axes and can be simultaneously adjusted in the same sense between a position in which they completely close the hydraulic lines and a position in which the hydraulic lines 12 are fully open via intermediate positions in which the hydraulic lines 12 are more or less constricted. For that purpose the pins 13a are connected to an adjusting ring 14 for displacing said pins in the direction of their axes. That adjusting ring 14 is slidably mounted on the driven shaft 5 outside the housing 6, 7, 8. The action of the hydraulic fluid in the lines 12 on the pistons 10 forces the pistons 10 against the elevations and depressions 3, 4 so that a rotation of the driving shaft 1 and of the disc-shaped coupling member 2 will cause the pistons to be reciprocated and the torque determined by the free cross-sectional area at the throttle valves will be transmitted to the coupling member that is constituted by the parts 6, 7 and 8.

I claim:

1. A shaft coupling comprising
    first and second coupling members adapted to be associated with respective shafts,
    said first coupling member having a coupling face and a rear face and being formed with a circumferential annular series of bores which are even in number and have a uniform angular spacing, each of said bores having a longitudinal axis, an open inner end in said coupling face and an open outer end in said rear face,
    a plurality of pistons, each of which is slidably mounted in one of said bores to travel along said longitudinal axis, each of said pistons having a rear end face disposed in said bore and a coupling end face formed with an apex protruding from said coupling face,
    said second coupling member having a coupling face facing said coupling face of said first coupling member and formed with a circumferential annular series of alternating elevations and depressions which have a uniform angular spacing and uniform constant angles between said elevations and depressions, and are aligned with said annular series of bores, said apices of said pistons bearing against said elevations and depressions,
    means for applying fluid pressure through said rear ends of said bores to said rear end faces of said pistons to urge said apices against said elevations and depressions,
    said bores being associated as pairs of diametrically opposite bores so that fluid pressure is applied simultaneously to said pistons in said associated pairs of bores,
    the bores of each of said pairs communicating with each other through a hydraulic line, which is adapted to be permanently completely filled with hydraulic liquid,
    a throttle valve associated with each of said hydraulic lines and being operable to vary the free cross-sectional area of said line adjacent to said throttle valve, and
    adjacent ones of said elevations and depressions merging into each other.

2. The shaft coupling set forth in claim 1 wherein said annular series of bores and said annular series of alternating elevations and depressions are circular series centered on a common axis.

3. The shaft coupling set forth in claim 2 further comprising a shaft connected to said first coupling member, wherein
    said hydraulic lines extend in said first coupling member,
    said first coupling member is formed with a plurality of valve bores which are parallel to said common axis and intersect respective ones of said hydraulic lines,
    each of said throttle valve comprises a pin, which is slidably mounted in one of said valve bores and movable beteen closed and open positions relative to said hydraulic lines and adapted to completely close said hydraulic line in said closed position and to entirely open said hydraulic line in said open position, and
    an adjusting ring is axially slidably mounted on said shaft connected to said first coupling member and is operatively connected to all said pins and operable to simultaneously move all said pins between said closed and open positions together.

4. The shaft coupling set forth in claim 1, wherein said coupling end face of each of said pistons has at least one beveled surface 5. The shaft coupling set forth in claim 1, wherein said coupling end face of each of said pistons has two beveled surfaces.

6. The shaft coupling set forth in claim 1, wherein said coupling end face of each of said pistons is a crowned surface.

7. The shaft coupling set forth in claim 1, wherein means are provided for simultaneously actuating all said throttle valves together.

8. The shaft coupling set forth in claim 1, wherein each of said throttle valves is operable to change the free cross-sectional area of the associated hydraulic line from a zero flow area to an unconstricted flow area.

9. The improvement set forth in claim 1, wherein there is an odd number of said elevations and an odd number of said depressions.

* * * * *